United States Patent
Parvulescu et al.

(12)

(10) Patent No.: US 6,252,517 B1
(45) Date of Patent: *Jun. 26, 2001

(54) SYSTEM AND METHOD FOR THE TRANSMISSION OF VOICE MESSAGES AS CODE OVER A WIRELESS MESSAGING NETWORK

(75) Inventors: Adrian Parvulescu, Fish's Eddy, NY (US); Sophie Klym, Lincoln Park; Andrew Todd Zidel, Westfield, both of NJ (US)

(73) Assignees: Sony Corporation, Tokyo (JP); Sony Electronics, Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/109,262
(22) Filed: Jun. 30, 1998
(51) Int. Cl.[7] .................................................. G08B 5/22
(52) U.S. Cl. ................... 340/825.44; 455/422; 455/466; 455/517; 455/556; 455/31.2
(58) Field of Search ....................... 340/825.44; 455/466, 455/422, 462, 517, 524, 556, 31.2, 459, 465

(56) References Cited

U.S. PATENT DOCUMENTS 4,330,780 * 5/1982 Masaki ............................ 340/825.44
5,491,739 * 2/1996 Wadin et al. ........................ 455/31.2
5,561,702 * 10/1996 Lipp et al. ........................ 340/825.44
5,821,874 * 10/1998 Parvulescu et al. ............ 340/825.44

* cited by examiner

Primary Examiner—Michael Horabik
Assistant Examiner—Yves Dalencourt
(74) Attorney, Agent, or Firm—Christopher M. Tobin; Harold T. Fujii

(57) ABSTRACT

A system and method of transmitting customized voice messages from a first voice messaging device to a second voice messaging device over a messaging network. A customized voice message is initially transmitted from a first voice messaging device to a second voice messaging device over the messaging network, including a first base station. The first base station assigns a unique code for that customized voice message, and then transmits that customized voice message and unique code over the messaging network to the second voice messaging device, the latter of which stores the customized voice message and the unique code associated with it. The first base station also stores the unique code in memory. Upon subsequent transmission of that same customized voice message from the first voice messaging device to the second voice messaging device, only the unique code will be transmitted to the second voice messaging device, the latter of which will then retrieve from its memory the customized voice message associated with the unique code.

8 Claims, 5 Drawing Sheets

SYSTEM AND METHOD FOR THE TRANSMISSION OF VOICE MESSAGES AS CODE OVER A WIRELESS MESSAGING NETWORK

BACKGROUND OF THE INVENTION

1. Field of the Invention

This invention relates to two-way messaging systems. More particularly, it relates to a two-way wireless voice messaging system in which custom voice messages may be recorded and then transmitted as unique codes.

2. General Background

Two-way text messaging systems having limited capabilities have been recently introduced on a commercial basis. Some such two-way text messaging systems allow a calling party, if desired, to append one or more custom text reply messages to a phone number or voice message which is then transmitted to a messaging receiver of a called party. The called party then may review the incoming page and select, as his response, one of the custom reply messages added by the calling party and which was appended to the incoming page before transmission. If the calling party does not append a custom reply message to the phone number or voice message, the called party can reply with one of a selected number of predetermined responses stored in memory in his messaging device. In such systems, the called party usually then transmits back his selected response to a central "mailbox" operated by the paging company or other communications company. The calling party can then call this "mailbox" to retrieve the response. For example, the calling party, "A", may wish to contact a business associate, "B", in order to arrange a meeting place for a business meeting. "A" may then place a call to the associate's messaging device and leave a message, "I would like to arrange to meet with you today at 2:00 P.M. Where should we meet?". In addition to this voice message, the calling party, "A", could then append one or several responses from which he would like the associate to select; e.g., "[Calling party's (A's)] office", "[Associate's (B's)] office", "Dans La Lune Cafe", etc. The voice message and appended custom reply are then transmitted to the messaging device of the business associate "B". Upon reviewing the incoming message, the associate "B" may then select from one of the aforementioned three appended custom messages, which he then transmits to the "mailbox" of the paging company's network operating center for storage and later retrieval by the calling party "A". Alternatively, if the calling party "A" does not originally append a custom reply message, the associate "B" may select one of a number of predetermined responses stored in memory in his messaging device and transmit such selected response for storage at the network operating center.

Importantly, in some of such systems, the prerecorded messages are transmitted as compact codes on the order of as little as one byte of data, in order to save air time costs to the user and to reduce traffic on the network. It will be understood that this "coding" is only readily possible for those responses which are prerecorded in the messaging device's memory at the time of manufacture and thus previously associated with a unique code. Thus, when the network operating center receives the unique code from the messaging device, it will recognize the message associated with the code and replay the appropriate response associated therewith. A drawback with such a system is that the selection of prerecorded messages which may be transmitted in response is quite limited.

Partly in response to such limitations, true two-way messaging has been proposed recently wherein the user of the receiving messaging device may indeed respond to a voice message with either a customized prerecorded or live voice message. One example of such system is set forth in U.S. Ser. No. 09/109,263 entitled "System and Method for the Creation of Customized Voice Responses in a Two-way Messaging Network" (Parvulescu & Zidel), which is assigned to the assignee of the present application and is incorporated by reference herein. In the system shown therein, the messaging device user cannot only reply to an incoming message with a prerecorded message stored in the messaging device memory by the manufacturer, but can record his own message, which is digitized and encoded and then transmitted back to the caller's messaging device (if the caller has a two-way messaging device) or to a network operating center for subsequent retrieval by the caller. In another embodiment, the messaging device user can create a custom message and append same to one of the prerecorded messages before transmission. Such "true" two-way messaging systems allow flexibility in the content of voice messages transmitted along with the added attraction of allowing the called and calling parties to actually hear the other's voice. However in all these systems, the entire message is transmitted to the caller's messaging device, and as such messages may comprise as much as two to twenty kilobytes, it is not always economical and efficient to transmit voice messages, particularly during times when traffic volume over the messaging network is heavy. Other examples of similar systems may be seen in U.S. Ser. No. 08/577,797 (filed Dec. 22, 1995) for "Two Way Messaging System with Non-Real Time Voice Compression and Decompression" (Parvulescu & Zidel), and U.S. Pat. No. 5,724,410 for "Two-Way Voice Messaging Terminal Having a Speech to Text Converter" (Parvulescu & Zidel) (issued Mar. 3, 1998), both of which are assigned to the assignee of the present application, and incorporated by reference herein.

So, while "live" voice messages are preferable to many users, because prerecorded messages consume less network time and capacity, and are therefore more economical, there are some times when it is more desirable to those same users to respond with prerecorded voice messages. However, again, while these latter systems make efficient use of the messaging network by transmitting prerecorded voice messages as smaller sized codes, they do not allow for the user to transmit true custom recorded voice messages.

It would therefore be desirable to provide a two-way voice messaging system which would allow the user to combine the flexibility of the aforementioned systems, allowing for the creation of true customized voice messages, with the efficiency and economy of those systems which transmit prerecorded voice messages as unique compact codes.

SUMMARY OF THE INVENTION

Accordingly, it is one object of the invention to provide a two-way wireless messaging system which has the capability of transmitting and receiving voice messages.

It is another object of the invention to allow a user to transmit and receive customized voice messages.

Still another object of the present invention to provide a two-way voice messaging system which allows the user to transmit and receive voice messages efficiently and economically in an attempt to reduce overall traffic on the messaging network.

It is yet another object of the invention to provide a two-way voice messaging system in which the users can efficiently transmit customized voice messages by assigning unique, compact messaging codes to each message and then transmitting such compact codes to another user having a messaging device which, upon receipt of such code, can replay the voice message associated with such unique code.

Therefore, in accordance with one aspect of the invention, a system for transmitting customized voice messages over a two-way voice messaging network is provided, including a first voice messaging device for recording and transmitting a customized voice message to a second voice messaging device, and network operating means, including a first base station for receiving the customized voice message for determining whether the customized voice message has previously been transmitted to the second voice messaging device. If the customized voice message has not been transmitted previously, the first base station assigns a unique code to the customized voice message, and then transmits the customized voice message with the unique code to the second voice messaging device. The customized voice message is then stored in association with the unique code in a permanent memory in the second voice messaging device. Alternatively, if the customized voice message has been transmitted previously, the first base station transmits the unique code to the second voice messaging device. As a result, once the customized voice message has been assigned a unique code in the first base station and transmitted to the second voice messaging device and stored in memory therein, there is no need to repeatedly retransmit the entire customized voice message to the second voice messaging device. Instead a code representing that customized voice message may be transmitted. Because the amount of information contained in the unique code is smaller than that required for a voice message, it is anticipated that the system of this invention will assist in alleviating traffic congestion over the messaging network.

The features of the present invention which are believed to be novel are set forth with particularity in the appended claims. However, the invention itself together with further objects, advantages and features thereof, may be best understood with reference to the following description in conjunction with the accompanying drawings.

DETAILED DESCRIPTION OF THE PREFERRED EMBODIMENT

An embodiment of the system and method for transmitting information as code will now be described in detail with reference to the accompanying drawings.

Figure 1:
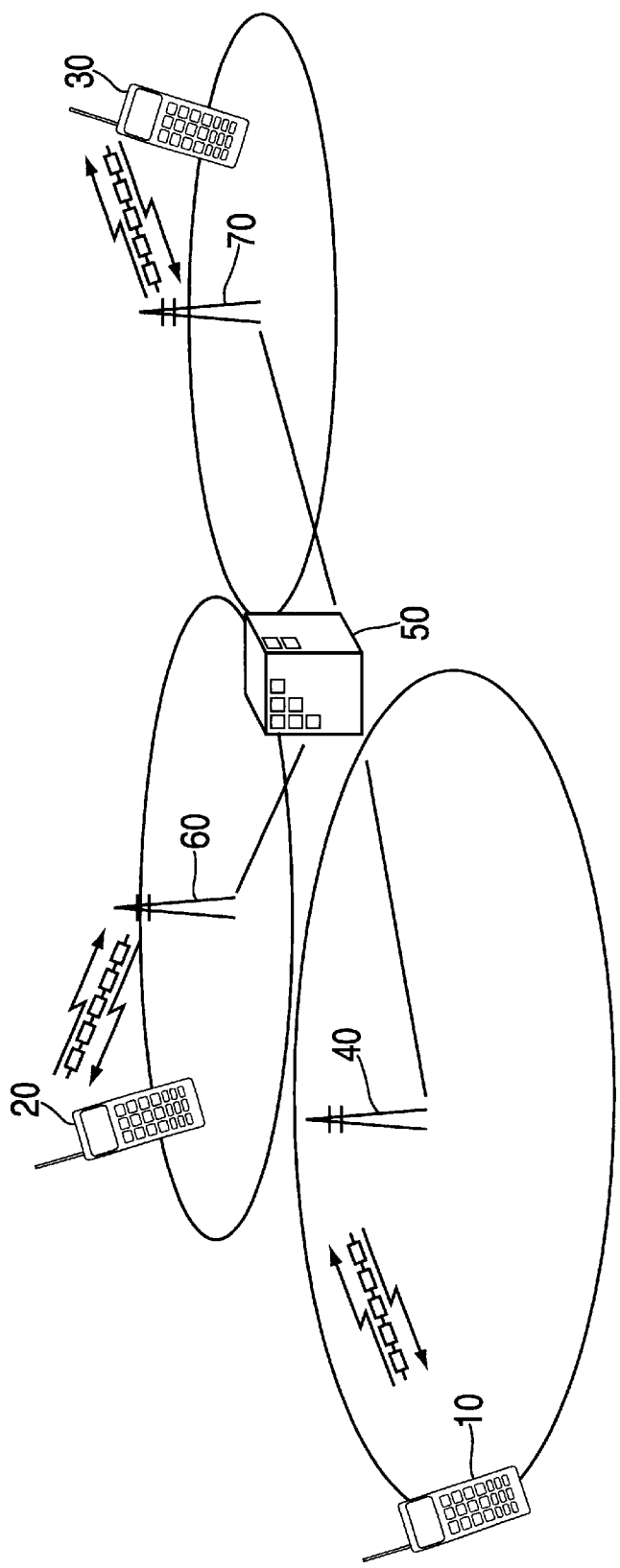
FIG. 1 shows a schematic of a two-way voice messaging system known in the art.

The two-way wireless messaging system of the present invention is preferably effected over a cellular-type packet switched network, such as seen in FIG. 1. However, it will be appreciated by those skilled in the art that the present invention is not so limited, and may be effected through other networks, such as satellite-based networks. In the cellular-type packet switched network of FIG. 1, messaging devices 10, 20, and 30 are preferably capable of transmitting/receiving two-way voice messages. In operation, a user records a voice message in one of the messaging devices; e.g., messaging device 10, and appends destination information, identifying as a destination, the desired receiving device; e.g., messaging device 20. Messaging device 10 then preferably compresses the voice message, encodes it, and thereafter transmits it to the appropriate base station covering the area in which the messaging device 10 is located; e.g., base station 40. The message is transmitted over the air as packet data.

Base station 40 receives the packet data transmitted from messaging device 10, and then transmits same to a network operating center 50, which, in turn, sends the packet data to a destination base station 60 which covers the area in which the receiving messaging device 20 is located. Destination base station 60 transmits the packet data over the air to receiving messaging device 20 in accordance with the destination address in the packet data. If the receiving messaging device 20 is a two-way messaging device, it transmits an acknowledgment signal back to the base station 60.

Figure 2:
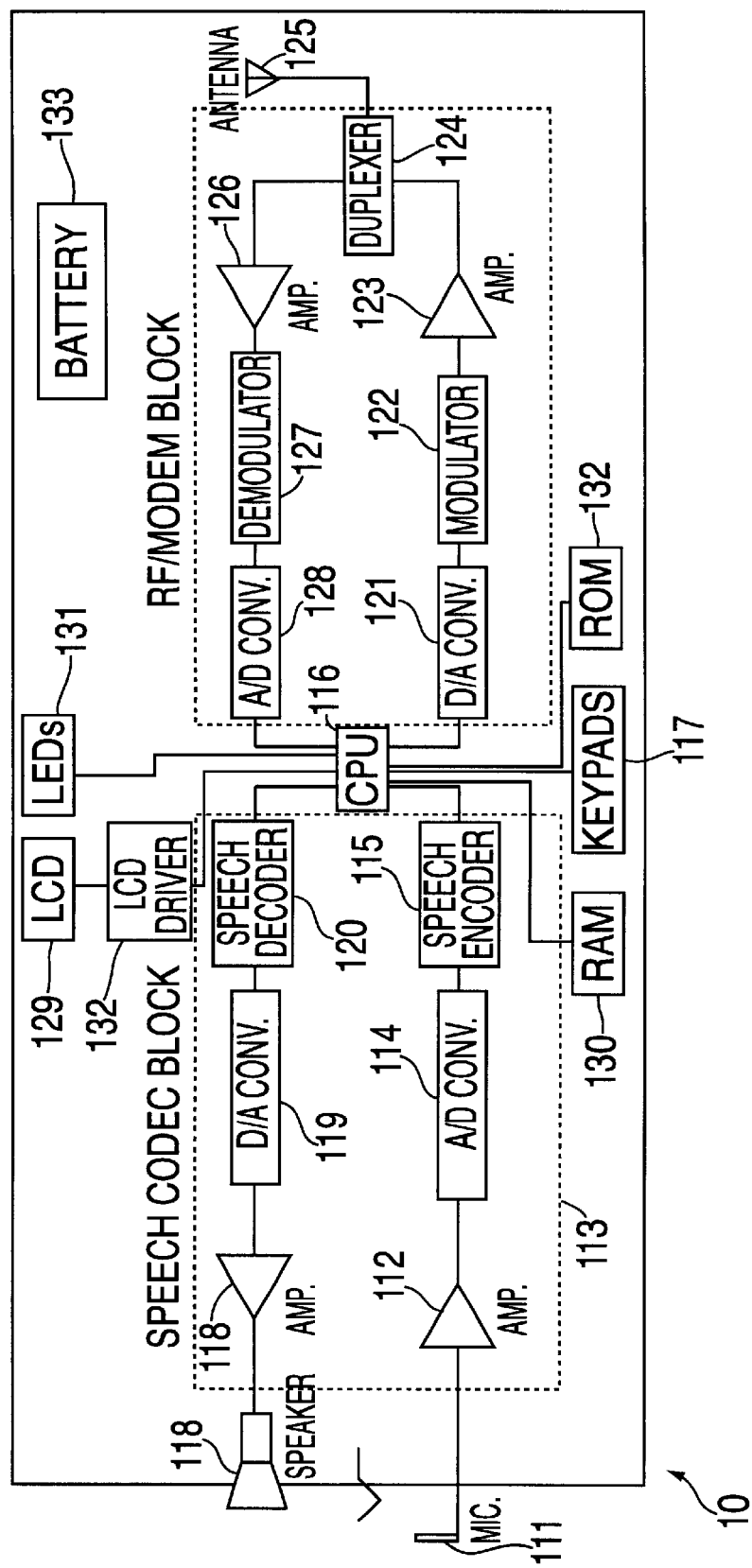
FIG. 2 shows a block diagram of one embodiment of a voice messaging device which may be used in the two-way messaging system of the present invention.

An embodiment of the messaging devices 10, 20, and 30 is shown in FIG. 1. The messaging device 10 preferably includes a microphone or microphone jack 111 for receiving voice signals to be transmitted. The user of the messaging device 10 actuates a "record" button or switch (not shown) to begin the recording of the voice signals comprising the message to be transmitted, and then speaks into the microphone 111. The output of the microphone is then provided to a device 113, which preferably is a CODEC device. Once received in CODEC device 113, the signal may be amplified by an amplifier 112, and then converted from an analog voice signal to a coded digital signal in A/D converter 114. A speech encoder 115 then encodes the coded digital signal with any suitable speech encoding algorithm as known in the art. As shown in FIG. 2, while this device 113 is preferably a CODEC it will be understood that such device 113 may be implemented as a process carried out in a digital signal processor.

This coded digital signal is then stored in a memory 130 under the control of controller 116. In one embodiment, the messaging device also includes circuitry for playing back the message just recorded in order to verify the accuracy of the message and to make any corrections deemed appropriate. Such playback circuitry generally includes an actuator (not shown) or keyboard 117, connected to the memory 130, which when actuated by the user of the messaging device 10, will cause the memory 130 to read out the coded digital signal to the CODEC device 113 for decoding, the analog output of which is supplied to an audio reproducing unit 118 for reproduction of the voice message. If the user desires to correct or alter the message, he may actuate the "record" button or switch (not shown) again to begin the re-recording. The voice signals comprising the new voice message will then be re-written into the memory 130.

After the user has recorded the message and stored same in the memory 130, the user may transmit the message by actuating a transmit switch or button (not shown). Under the control of controller 116, the message will be read out as a coded digital signal from the memory 130 to a D/A converter 121, the analog output of which will then be sent to or modulator 122, the latter of which will encode the voice message with a communications protocol appropriate to the particular messaging service and coding standard being used (e.g., POCSAG, FLEX, etc). Once the message has been encoded, it may then be amplified in amplifier 123 and forwarded to duplexing unit 124, where it will be transmitted over an antenna 125 to base station 40. Processing of the customized voice message in accordance with the system of the present invention will now be described in conjunction with FIGS. 3–5.

Figure 3:
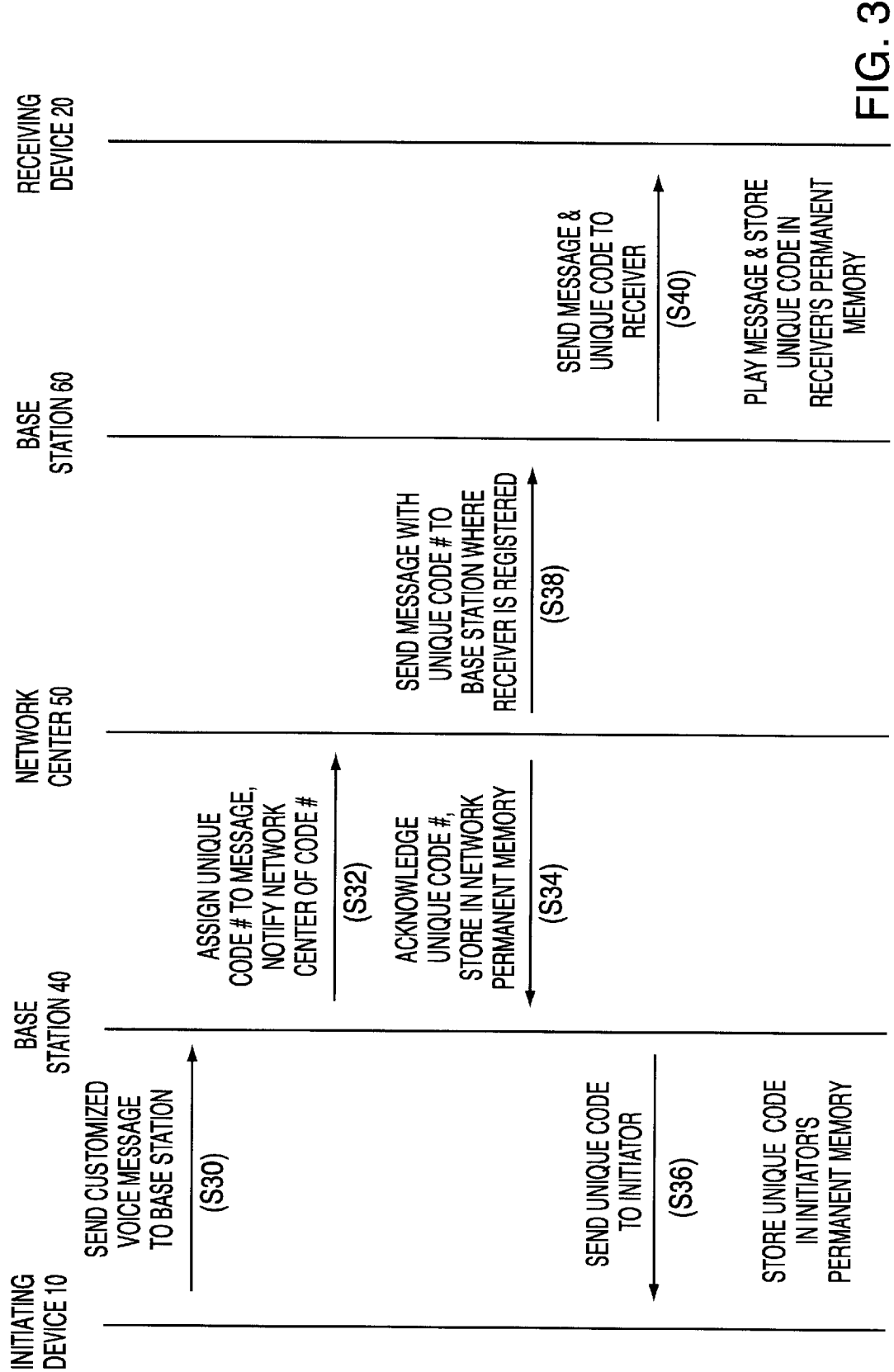
FIG. 3 is a diagram showing the processing of a user-created/customized voice message during its initial transmission from a first messaging device to a second messaging device in the system of the present invention.

With reference to FIG. 3, and in accordance with the system of the present invention, when a customized voice message "A" is initially transmitted from antenna 38 (S30), again it is forwarded to base station 40 which receives such message and checks memory stored therein (not shown) to see if it has previously received this message from this messaging device. If not, base station 40 assigns/appends a unique code $n_1$ to such message and then transmits the message "A" and appended code to the network operating center 50 (S32).

Upon successful receipt of the message "A" and the unique code $n_1$ assigned thereto, the network operating center 50 sends back to the base station 40 a signal acknowledging that the message "A" and unique code $n_1$ have been received. The message "A" and unique code $n_1$ are then stored in permanent memory in the base station 40 (S34). The base station 40 then sends a signal including the unique code $n_1$ back to the initiating messaging device (e.g., 10) where the unique code $n_1$ is stored in permanent memory therein (S36). In a preferred embodiment, this unique code is a simple numeric code comprising approximately one byte of data. It will be understood to those skilled in the art that the coding format of the unique code assigned to each customized voice message may comprise any type of binary coding or the like, and that the invention is not limited to any particular such coding format. In addition to sending an acknowledgment signal back to base station 40, and in accordance with well known paging system operations and traffic control, the network operating center 50 processes the message in accordance with known traffic and call methods, and then routes message "A" and unique code $n_1$ to that base station (e.g., 60) with which the intended receiving messaging device (e.g., 20) is registered.(S38).

Upon successful receipt in base station 60 of the message "A" and unique code $n_1$, the base station 60 transmits the message "A" and unique code $n_1$ to the receiving messaging device 20 (S40). The voice message "A" is then decoded and decompressed for audible replay. In addition, the still encoded, compressed voice message "A" and the unique code $n_1$ are also stored in the receiving message device's permanent memory for later retrieval as will be discussed below. Thus, once a customized voice message and unique code are initially transmitted from an initiating messaging device to a receiving messaging device, and stored in the memory of the latter, subsequent transmissions of this same message require only that the unique code assigned to the message be transmitted.

Figure 4:
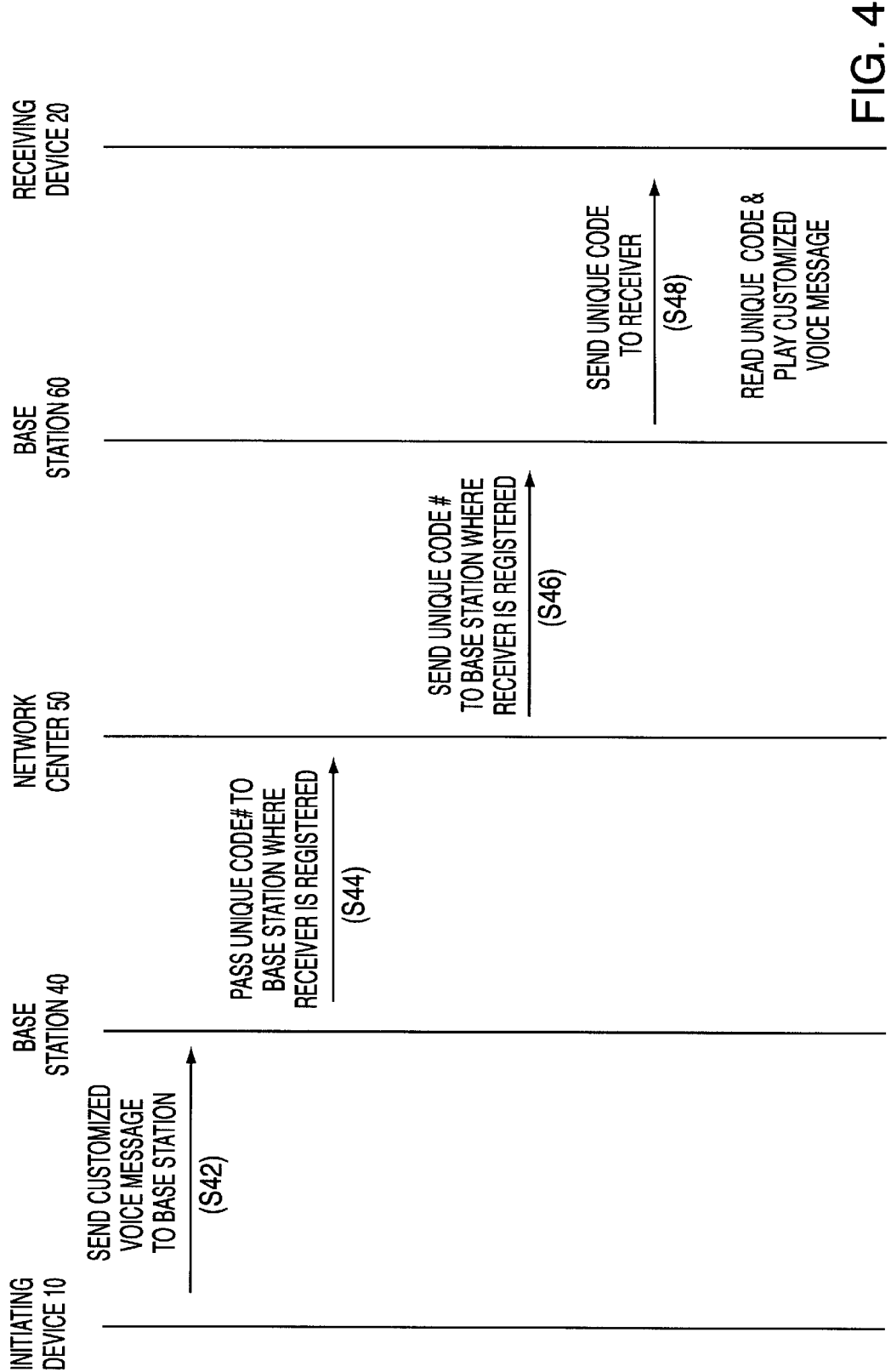
FIG. 4 is a diagram showing the subsequent processing of a user created/customized voice message from the first messaging device to the second messaging device after the message's initial transmission of FIG. 3.

FIG. 4 shows the processing of the message "A" from the initiating messaging device 10 to the receiving messaging device 20, after the initial transmission of this in accordance with the processing discussed above with respect to FIG. 3. As the unique code $n_1$ associated with voice message "A" has now been stored in memory in base station 40, subsequent transmission of that same voice message—"A"—from messaging device 10 to base station 40 (S42), will cause base station 40 to search its memory and to ascertain the unique code previously assigned to that message "A"; i.e., $n_1$. Base station 40 will then transmit only the unique code $n_1$ (S44) to the network operating center 50, which will then route the unique code $n_1$ to the base station with which the intended receiving messaging device 20 is registered (e.g., base station 60) (S46). The base station 60 will in turn transmit the unique code $n_1$ to the receiving messaging device 20, which upon receipt of such code $n_1$ will search its permanent memory to determine if such code $n_1$ is stored therein (S48). If it is, the receiving messaging device 20 will cause the memory to read out the encoded, compressed version of the message associated with the unique code $n_1$; i.e., message "A", where it will be decompressed and decoded for audible replay. It will be appreciated that as the data comprising the unique code is substantially smaller than that of a standard voice message (which, again, is on the order of two to twenty kilobytes), this system allows for a more efficient and economical transmission of customized voice messages and is expected to assist in reducing overall traffic on the messaging network.

Figure 5:
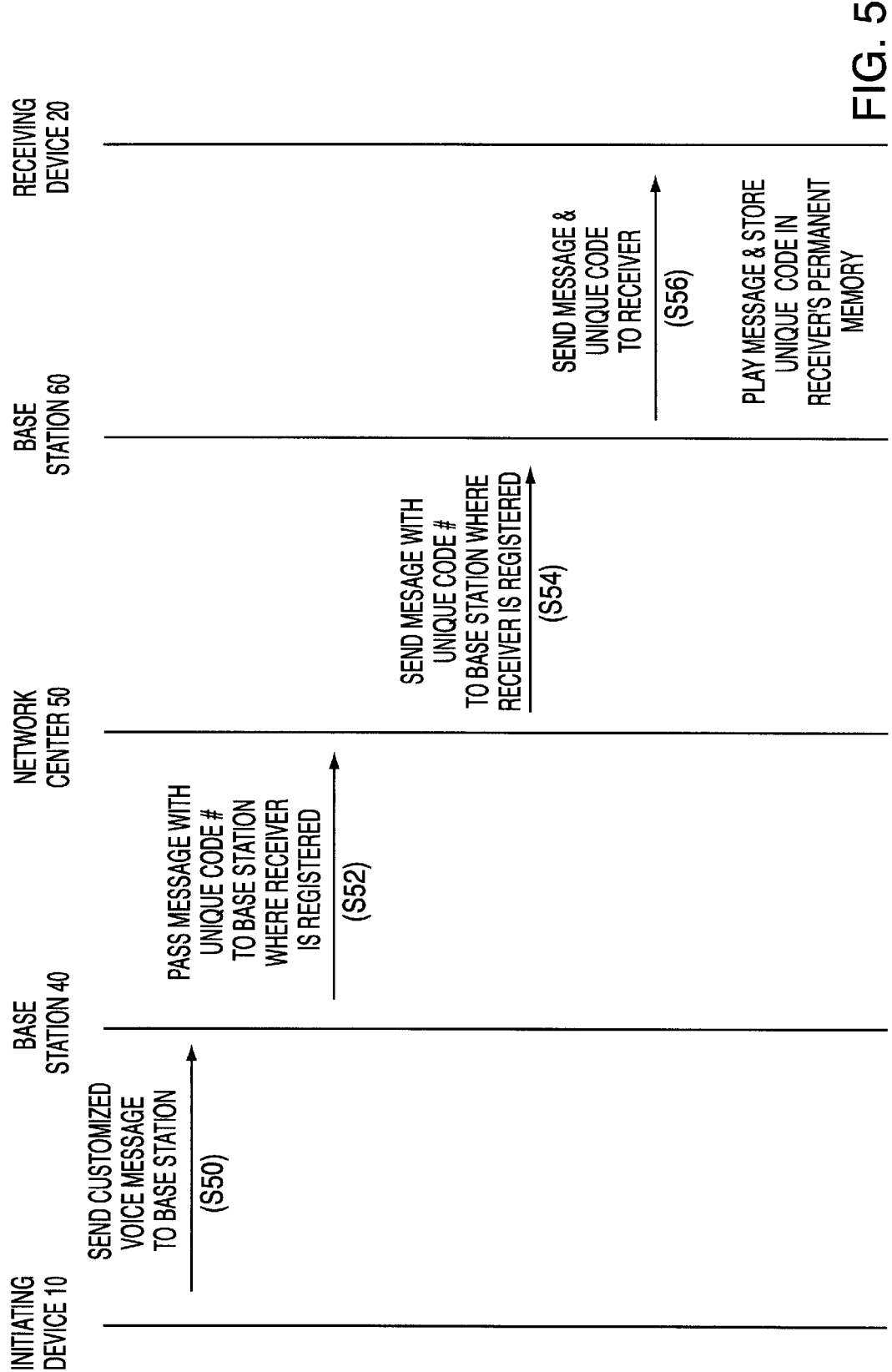
FIG. 5 is a diagram showing the processing of a user-created/customized voice message from the first messaging device to a third messaging device, after the message's initial transmission of FIG. 3.

In some instances the user of the initiating messaging device 10 would like to transmit a customized voice message which has already been assigned a unique code—e.g., voice message "A"—to a different receiving messaging device (as seen in FIG. 5). Thus, while the message has been assigned a unique code which is recognizable by the base station 40 (as, again, the unique code has previously been stored therein), the new intended receiving messaging device (e.g., 30) will not recognize such code and thus the message "A" will have to be transmitted again. However, because base station 40 has previously assigned a unique code to message "A", and has stored the unique code $n_1$ in a permanent memory, once base station 40 receives customized voice message "A" (S50), it will search its memory for the unique code $n_1$ associated with message "A" and then transmit the message "A" and unique code $n_1$ on to the network operating center 50 (S52) which, after known traffic and call processing steps, will transmit both message "A" and unique code $n_1$ to the appropriate base station (e.g., base station 70) with which the intended receiving messaging device 30 is registered (S54). Thereafter, processing of the message "A" and code $n_1$ in the base station 70 and receiving device 30 is the same as discussed with reference to the initial transmission of message "A" to base station 40 and receiving messaging device 20 (FIG. 3), with the message being decoded, decompressed, and audibly replayed, and the encoded, compressed message and code being stored in memory in the receiving messaging device 30. As with the receiving messaging device 20, subsequent transmissions of message "A" from base station 40 to messaging device 30 would only require the transmission of the unique code $n_1$.

As it is expected that this system could be used for small groups of users, such as family members, the number of customized responses is also expected to be small. For example, the number of bits required for all the unique codes for approximately fifteen customized voice messages is about half a byte, or 4 bits. When compared with the 2–20 kilobytes of information required for just one user-originated voice message, it is expected that the savings in network capacity and transmission time could be substantial. Further, although larger groups would require a unique code comprising few bytes of information, it is still expected that substantial savings could be expected.

It is therefore apparent that in accordance with the present invention, an embodiment that fully satisfies the objectives, aims, and advantages is set forth above. While the invention has been described in conjunction with specific embodiments, it is evident that many alternatives, modifications, permutations, and variations will become apparent to those skilled in the art in light of the foregoing description. Accordingly, it is intended that the present invention embrace all such alternatives, modifications, and variations as fall within the scope of the appended claims.

What is claimed is:

1. A method of transmitting customized voice messages from a first voice messaging device to a second voice messaging device over a messaging network having a network operating center and at least a first and second base station, the method comprising the steps of:

transmitting a customized voice message from a first voice messaging device to a first base station;

determining in said first base station whether said customized voice message has been previously transmitted to said second voice messaging device;

wherein if it is determined that said customized voice message has been previously transmitted to said second voice messaging device, said first base station transmits a unique code identifying said customized voice message over said messaging network to said second voice messaging device, and wherein if it is determined that said customized voice message has not been previously transmitted to said second voice messaging device, said first base station assigns a unique code identifying said customized voice message and transmits said customized voice message and said unique code over said messaging network to said second voice messaging device.

2. The method of claim 1, wherein if it is determined that said customized voice message has not been previously transmitted to said second voice messaging device, the method further comprising the steps of:

transmitting an acknowledgment signal from said network operating center to said first base station; and, storing said customized voice message and said unique code in permanent memory in said first base station upon receipt of said acknowledgment signal.

3. The method of claim 2, further comprising the steps of:

transmitting said unique code from said first base station to said first voice messaging device; and, storing said unique code in permanent memory in said first voice messaging device.

4. A system for transmitting customized voice messages over a two-way voice messaging network, comprising:

a first voice messaging device for recording and transmitting a customized voice message to a second voice messaging device; and, network operating means, including a first base station for receiving said customized voice message for determining whether said customized voice message has previously been transmitted to said second voice messaging device, wherein if said customized voice message has not been previously transmitted to said second voice messaging device, said first base station assigns a unique code to said customized voice message and transmits said customized voice message with said unique code to said second voice messaging device, and wherein if said customized voice message has been transmitted previously to said second voice messaging device, said first base station transmits said unique code to said second voice messaging device.

5. The system of claim 4, wherein said two-way voice messaging network is a cellular network.

6. The system of claim 4, wherein said second voice messaging device comprises:

a memory for storing information including voice messages and unique codes; and, audio reproducing means for playing said customized voice message.

7. The system of claim 6, wherein if said customized voice message has not been previously transmitted to said second voice messaging device, said second voice messaging device stores said unique code and said customized voice message in said memory.

8. The system of claim 6, wherein said network operating means further comprises:

a network operating center communicatively coupled to said first base station for completing traffic and message processing; and, a second base station communicatively coupled to said network operating center, wherein if it is determined in said first base station that said customized voice message has previously been transmitted to said second voice messaging device, said first base station transmits said unique code to said network operating center and said second base station.

* * * * *